INVENTORS.
WAYNE R. JOHNSON,
FINN JORGENSEN,
BY THEIR ATTORNEYS
Spensley & Horn

Sept. 16, 1969 W. R. JOHNSON ET AL 3,467,789

MAGNETIC RECORDING HEAD WITH BIAS APPLIED TO THE GAP SPACER

Filed Sept. 27, 1965 2 Sheets-Sheet 2

INVENTORS.
WAYNE R. JOHNSON,
FINN JORGENSEN,
BY THEIR ATTORNEYS
Spensley & Horn.

United States Patent Office 3,467,789

Patented Sept. 16, 1969

3,467,789

MAGNETIC RECORDING HEAD WITH BIAS APPLIED TO THE GAP SPACER

Wayne R. Johnson, Woodland Hills, and Finn Jorgensen, Sherman Oaks, Calif., assignors, by mesne assignments, to United Control Corporation, Redmond, Wash., a corporation of Delaware Filed Sept. 27, 1965, Ser. No. 490,337
Int. Cl. G11b 5/12
U.S. Cl. 179—100.2 3 Claims

ABSTRACT OF THE DISCLOSURE

A transducer is disclosed that provides a magnetic field having a sharp field gradient which facilitates consistent penetration into a recording medium. A bias signal of unusually high frequencies (substantially greater than five times the highest information signal and at least in excess of one-half megacycle) is applied to said transducer in the proximity of the magnetic medium.

This invention relates to a transducer and, in particular, to a transducer for recording on a magnetic medium.

It is common practice in the magnetic recording art to employ a core of magnetic material with one or more gaps in the core. The gaps have non-magnetic spacer material disposed therein and one or more coils are wrapped around the core. The coils are commonly supplied with electrical information signals and bias signals that create a magnetic flux which passes around the core. A magnetic recording medium passes adjacent one gap and, since the recording medium is a magnetic material and the gap is not, the greater part of the flux from the core passes from one pole tip (that is, the portion of the core adjacent the gap) to the medium and back to the other pole tip. The amount of flux passing through the medium is dependent on the relative reluctance of the various paths that the flux may follow in traversing the gap.

The above transducer and recording arrangement has, in general, proved satisfactory but it has a number of significant disadvantages and shortcomings. First, the reluctance of the path from the pole tips through the recording medium changes as the recording medium moves across the transducer and separation therefrom occurs. A change in reluctance directly effects the amount of flux that passes through the recording medium. This problem is pronounced in devices where the medium moves at high speeds across the transducer. For example, at recording medium speeds of 120 inches per second and greater, a self-generated air bearing is often created which pushes the recording medium away from the transducer and its gap. The wearing away of the pole tips and the gap edge also aggravates this problem.

In the arrangement described above, the fields created by the bias and information signals in the region of the gap are generally arch shaped with a gradually decreasing field gradient occurring to the right and left of the gap edges. The arch-shaped fields are relatively shallow, that is, they primarily extend only a short distance beyond the core in the region of the gap. This makes the recording process particularly sensitive to separation of the medium from the transducer. Under such circumstances separation results in substantial deterioration of the recording and in amplitude instability. In addition, the existence of minute recording medium irregularities (dropouts) will result in loss of information. Thus, the shape of the fields in prior art transducer arrangements is too shallow.

The recording by the arch-shaped fields generally takes place slightly to the right of the leading edge of the gap. The magnitude of the recording field and the field gradient at this point is not particularly high. It would be much more desirable if the recording took place as close as possible to the leading edge. Thus, field gradient in the most common prior art transducers is not sufficiently sharp.

The bias signal functions to linearize the characteristic of the magnetic recording medium, thereby minimizing distortion. To a certain point, increasing the magnitude of the bias signal lowers the distortion. However, increasing the bias level tends to erase the short wave length signals because of the bias fringing effect, thereby limiting bandwidth. Thus, in most common prior art transducers, adjusting the bias level is a difficult compromise between bandwidth and distortion.

The bias signal employed in recording transducers generally has a frequency of about five times the highest frequency of the information signal to be recorded. In machines adapted to record 1 megacycle information signals, a bias signal of about 5 megacycles is pumped through the core. The pumping of the core with such bias frequencies results in considerable power loss, notwithstanding the use of ferrites or micro-laminations in the core structure. A rather sophisticated bias oscillator is required for each core to provide the high-frequency bias power. In addition, a high-quality record amplifier is required. In the case of a multiple track machine, the electronics become quite elaborate and expensive. For example, a fourteen head stack with solid state oscillators and recording electronics costs about $5,000. From this it can be seen that the present arrangement employs relatively complex electronics which require a large initial expenditure, as well as high operating costs.

The use of micro-laminations (under 5 mil thickness) in core structures to minimize core losses has created other problems. The alignment of such laminations to form a well-defined gap edge has proven most difficult and costly with the results not being completely satisfactory. The use of ferrite cores has given rise to similar problems of gap edge definition. In addition, the gap edges in such cores are susceptible to erosion.

The many non-linear losses in the record and reproduce process results in the need for considerable equalization in the reproduce electronics. The use of equalization while adding linearity to the overall system operation tends to decrease the signal-noise ratio as the noise is equalized along with the signal.

When the information signal and the bias signal are supplied to the core, which is a common arrangement, the head resonance must be above the bias frequency which is the highest frequency supplied to the transducer. The resonant frequency is inversely proportional to the number of turns coupled to the transducer. Thus, the resonant frequency may be increased by decreasing the number of coil turns. The decrease in coil turns results in higher record current levels being required to arrive at a given amp-turn value.

Another limiting condition in prior art transducers is the inability to use such transducers with magnetic mediums having coercivities in excess of 300 oersteds. The short wave length performance of a transducer is related to the magnitude of the remanent flux value which is in turn proportional to the square root of the coercivity of the medium. In prior art transducers, the pole tips of common core materials saturate at flux density values below that necessary to effectively utilize high coercivity recording mediums, that is, recording mediums with coercivities in excess of 300 oersteds. The use of other cores to overcome this has generally resulted in an accompanying magnetostrictive effect which tends to destroy the structural integrity of the core and gap.

In summary, the most common prior art transducers have not provided optimum field gradient and field shape, and their use has involved considerable power losses in the core. This has resulted in poor amplitude stability, loss of bandwidth, recording losses, relative complexity, high initial costs, and high operating costs.

There have been many separate prior art attempts to solve one or more of the above problems. For example, the prior art workers have long searched for a transducer that would provide sharper field gradients and improve the field shape. To this end they have attempted to alter the fields by inserting a conductive shield in one of the pole pieces (U.S. Patent No. 2,854,524), by inserting a coil in the gap (U.S. Patent No. 2,479,308), and by employing a head having a third pole piece (U.S. Patent No. 2,628,285). For one reason or another, these prior art devices have failed to become commercially practical. One recent German patent (No. 1,120,172) has disclosed that it is worthwhile in an audio recorder to place a conductor in the gap and pump this conductor with the bias. This patent does not teach the use and importance of an unusually high-frequency bias in such an arrangement to take advantage of the skin effect.

The invention described hereinafter solves many of the above prior art problems and is a simple and practical answer to the long search for a transducer that provides a field having a sharp field gradient and a shape that facilitates penetration into the recording medium.

Briefly, the structure of the invention in general comprises an electromagnetic member for varying the magnetization of a magnetic medium adjacent a predetermined portion thereof, a means located in proximity to said predetermined portion for independently varying the magnetization of said magnetic medium, electrical information signal input terminals coupled to said member and bias signal input terminals coupled directly to said means for supplying thereto a bias signal of a frequency substantially more than five times the highest frequency component of the information signal.

In the above-described invented arrangement, the application of an unusually high-frequency (substantially greater than five times the highest information signal and at least in excess of one-half megacycle) bias signal to the bias-signal input terminals results in a bias field having a sharp gradient in the vicinity of the recording edge of the gap. This bias field is no longer arch shaped but rather similar to an ellipsoidal. This alteration of the bias field enables the bias to be applied more uniformly throughout the recording medium, enables a deeper penetration of the flux into the recording medium, minimizes the bias fringing effect, moves the critical or recording zone closer to the right or recording edge of the gap, and narrows the recording zone. With the high-frequency signal no longer pumped through the transducer, the efficiency of the transducer is improved, the pole tips do not readily saturate and the resonant frequency of the transducer must only be higher than the highest frequency information signal.

The above generally-described structure and advantage, along with specific embodiments that operate in accordance with this invention, will now be described in connection with the figures in the drawings, wherein:

FIG. 1 is a schematic representation of a transducer employing the invention;

FIG. 2*a* and 2*b* are exploded views of a portion of the transducer of FIG. 1, wherein the pole pieces gap and recording medium are shown in detail;

Figure 1:
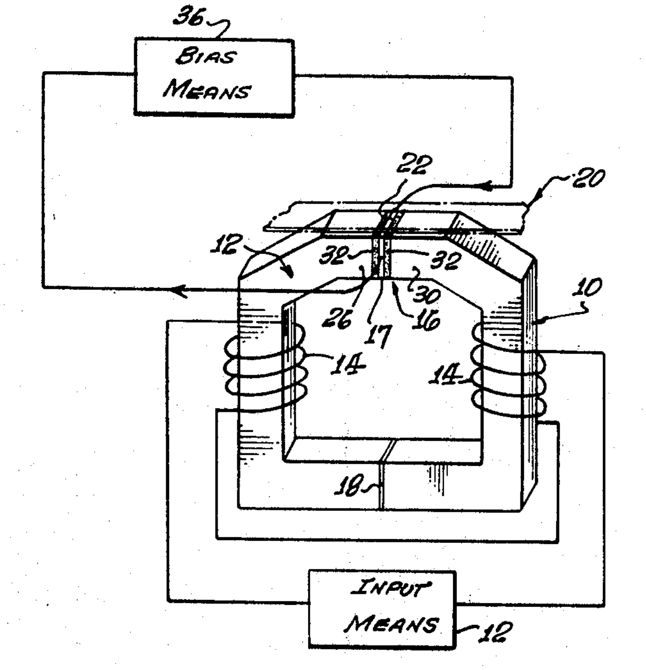

Referring to FIG. 1, a transducer built in accordance with this invention comprises an electromagnetic member for varying the magnetization of a magnetic medium 20 adjacent a predetermined portion thereof, such as core 10 which includes gap region 16. Core 10 has an electrical information signal supplied thereto by input means 12 coupled there to 10 by a pair of coils 14. The core 10 may have any of the various shapes that such transducers assume. For example, such cores have been known to be circular, square, rectangular, triangular, diamond and trapezoidally shaped. Such shapes, as well as the characteristics of a typical magnetic recording transducer, are discussed in the article "A Magnetic Record-Reproduce Head" by M. Rettinger, Journal of the SMPTE, volume 55, page 377, October 1950. The core may be made of ferrite, laminations of mu-metal or any of the other magnetic materials used for this purpose. It was found that the core of this embodiment may be made out of a solid magnetic material without the need for using laminations or ferrite materials. (This is made possible because core losses attributable to the bias signal are eliminated. The elimination of such losses is explained later in the specification.) The use of a solid core material enables the gap edge to be better defined thereby improving recording. It also lowers the cost of the individual transducers. It is within the broad scope of the invention to use pole shoes made of a material different from the core material.

The input means 12 may typically take the form of a record amplifier which amplifies information or data signals supplied thereto by such devices as a sensor or a computer output line. The invented transducer is well suited for information signals having frequencies in excess of 1 megacycle in view of its improved performance at the high end of the frequency bandwidth. It has been found that in accordance with this invention in many instances the record amplifier may be eliminated and a sensor or other means directly connected to coils 14 or connected to coils 14 via an impedance matching device. This is attributable to the fact that the invented transducer may operate at a higher efficiency. Thus, in one instance, it was found that an input means comprising a signal energy source, a level adjustment potentiometer, a DC blocking capacitor and a constant current resistor were all that was necessary.

The core 10 has a front gap region 16 and a back gap region 18. The front gap 16 lies adjacent recording medium 20 which may be moved to the right by an appropriate transport (not shown). It is gap 16 which is active during the recording process. The rear gap 18 typically contains a non-magnetic gap spacer such as a layer of silicon monoxide, glass, epoxy resin or a shim or foil of an appropriate metal, glass or ceramic. Some commercial transducers have employed butt-type joints in the rear gap.

An important feature of this invention is the construction of the front gap 16. The front gap 16 includes a means for independently varying the magnetization of a magnetic medium 20. The means may comprise a current-carrying means 22 in the form of a strip or foil of material such as copper, titanium or other conductor material located in the vicinity of the gap and, more particularly, between the confronting faces of pole pieces 26 and 30. In one preferred form, the current-carrying means 22 does not extend all the way through gap region 16 but is removed at the backside 17 to minimize the field emanating from this side. Typically, a few thousandths of an inch removal is all that is necessary. This removal makes the transducer more efficient.

The pole pieces 26 and 30 may be integral with the core 10 or may be formed of shoes made from a different material, such as described in U.S. Patent No. 2,866,011. The current-carrying means 22 may be separated from the pole pieces 26 and 30 by layers of non-magnetic gap spacer material 32 sandwiched between the faces of the current-carrying means 22 and pole pieces 26 and 30. The gap spacers 32 may be self-adherent or attached by a separate adhesive material. It has been found that gap spacer 32 may be eliminated. The gap spacer 32 may be made from layers of glass, silicon monoxide, epoxy, or other non-magnetic shims according to well-known techniques. When non-magnetic shims are employed between current-carrying means 22 and pole pieces 26 and 30, the assembly may be held together by mechanical clamping means or other holding means. The current-carrying means 22 along with the confronting faces of the pole pieces and spacers therebetween form a tri-plate strip transmission line gap. The strip line gap may be removed or separated from the gap region or may be partially removed therefrom and the core 10 may take on different geometries other than a closed magnetic path. It is also possible to eliminate the gap spacers in certain instances. For example, a conductor may be directly deposited or placed between the pole pieces of the core. The permeability of the core along with a sufficiently high-frequency bias field is enough to properly form the bias fields.

The current-carrying means 22 is directly connected to a bias means 36 which may take the form of a bias oscillator coupled to the current-carrying means 22. (The term "directly" as used herein includes at least capacitive, inductive or similar couplings.) The bias means 36 may be connected to drive current-carrying means 22 in a balanced or unbalanced manner as is well known in the coaxial cable or delay line art. The bias frequency is generally substantially greater than five times the highest frequency component of the information signal regardless of the frequency content of the information signal being over one-half megacycle. At frequencies under approximately one-half megacycle and employing common core materials (e.g., ferrite and sinimax), the skin effect is not generally pronounced. In tests with various bias frequencies, it was observed that improved performance was achieved as the bias frequency was increased. Bias frequencies such as 25 and 50 megacycles were employed with improved performance successively being attained. The only limitation on the attainment of improved performance in this manner is thought to arise from the maximum switching frequency of the recording medium spinels, that is, their relaxation frequency. The relaxation frequency is generally in excess of 100 megacycles. Thus, it is an important aspect of this invention to provide a transducer that is no longer governed by "five times the highest frequency rule" for determining the bias frequency and to employ bias frequencies in excess of this rule to improve performance.

Figure 2A:
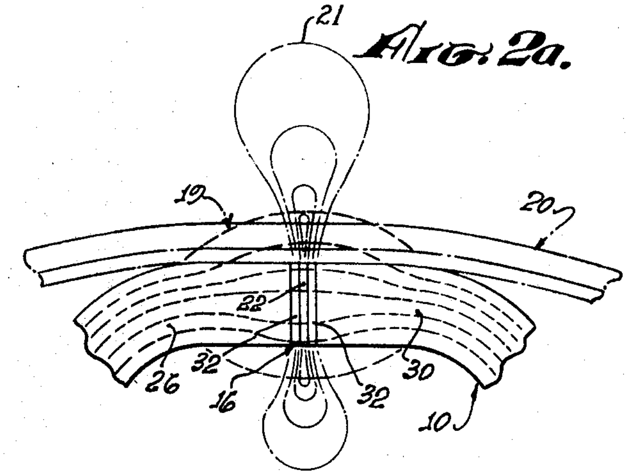
Figure 2B:
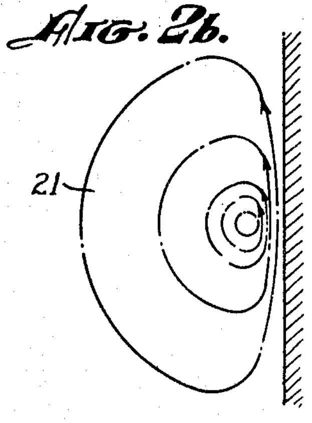

In operation, input means 12 supplied an information signal to core 10 in the form of an electrical current. This current passes through coils 14 and creates a magnetic field 19 which passes through core 10. Its path and shape in the vicinity of a front gap 16 is shown in detail in FIG. 2*a*. Simultaneously, with the application of the information signal, a bias signal is applied to the current-carrying means 22 which in turn creates a magnetic field 21 as illustrated in FIGS. 2*a* and 2*b*. It should be noted that in this embodiment the bias field does not pass through the core as in common practice in the magnetic recording art but is directly applied to the recording medium 20 by current-carrying means 22. The magnetic field formed by current-carrying means 22 does not take the usual cylindrical shape of a magnetic field surrounding a conductor but rather takes an ellipsoidal shape. The ellipsoidal bias field is achieved by coaction of the field from means 22 with the confronting faces of the pole pieces, in accordance with what is known as the skin effect. The magnetic field created by the current-carrying means 22 penetrates the core and generates eddy currents therein. These currents which concentrate near the surface of the core at unusually high frequencies in turn create magnetic fields that confine or focus the field created by current-carrying means 22 within the front gap region 16 and causes it to bulge outwardly through the recording medium 20. The depth of penetration of the magnetic field created by current-carrying means 22 into pole pieces 26 and 30 is controlled by the expression:

$$S(\text{skin depth}) = \frac{66\,(K_{1\,\max})}{\sqrt{F_{\text{bias}}}} \times 10^{-6} \text{ meter}$$

where $F_{bias}$ is the bias frequency in megacycles and generally in the invention ranges from one-half megacycle to 100 megacycles or more, and $K_{1\,max}$ equals $$\sqrt{\frac{1}{\mu_2} \times \frac{\rho}{\rho_C}}$$

where $\mu_2$ is the relative permeability of the core material as compared with air, $\rho$ is the conductivity of copper in ohms per meter, and $\rho_C$ is the conductivity of the core material in ohms per meter. Various values of $K_{1\,max}$ are as follows:

| | |
|---|---|
| Copper | 1 |
| Nickel | 1/5 |
| Mu-metal | 1/52 |
| Sendust | 1/58 |

From the above it can be seen that an important aspect of the invention is maintaining the skin depth at relatively low values. The skin depth S may be kept to a minimum by increasing the bias frequency and by employing material of relatively high magnetic permeability. It is within the scope of the invention to plate or coat the confronting faces of the pole pieces with material that would tend to reduce the skin depth. For example, a ferrite core may have faces coated with sendust (iron, silicon and aluminum alloy). It is preferred that the value of the skin depth be maintained at a value less than $2.5 \times 10^{-6}$ meters. This value may be attained in a mu-metal transducer at a 1 megacycle bias frequency. Since the invented transducer is preferably employed to record information signals in excess of 100 kc. (herein referred to as high-frequency information signals), the bias frequency in such a situation would probably have approximately a 10:1 ratio with the highest frequency component of the information signal, if not more.

From FIGS. 2*a* and 2*b*, it can be seen that the bias field has a field gradient with a much steeper characteristic, as compared with prior art transducers. This bias field penetrates the recording medium 20 more uniformly than prior art transducers where both the bias and the information fields take a form such as the information field in FIG. 2*a*. In addition, the recording zone or the critical zone (i.e., the point at which recording takes place) is positioned more to the left and in the immediate vicinity of the trailing (right-hand) edge of the transducer of FIGS. 1 and 2 as compared with prior art transducers. This movement of the recording zone to the left enables recording to take place at a position along the transducer where the fields resulting from the information signal have a higher value. This enables lower recording levels to be employed to attain the same output as prior art transducers employing higher recording levels. The use of lower recording levels is also facilitated by the larger number of turns that may be employed on a transducer. The larger number of turns is made possible by the lower resonant frequency of the core which is enabled by removing the high-frequency bias signal from the core. The resonant frequency of the core is determined by the information signal which is a lower frequency than the bias signal.

As can readily be seen in FIG. 2*a*, the shape of the field makes the transducer relatively insensitive to movement of the recording medium away from the core 10. The field penetrates the tape to a sufficient depth to record, notwithstanding the existence of minute imperfections on the surface of the tape, thereby providing greater amplitude stability and reliability. The confining of the bias field within the gap reduces the fringing of the bias field, thereby minimizing bias erasure and enabling higher bias level settings without decreasing the bandwidth. Increasing the bias level settings decreases distortion. In the alternative, the bias level settings may remain the same and the bandwidth extended by the decreased fringing erasure. In some tests a 6 db improvement has been achieved at the short wave lengths. The facility to directly bias the recording medium without passing the high-frequency bias signal through the core eliminates the core losses attributable to the bias signal. This substantially simplifies the biasing means and reduces the need for reproduce equalization resulting in an improved signal to noise ratio. The direct unusually high-frequency bias also minimizes pole tip saturation which in turn enables higher coercivity recording mediums to be employed. This in turn improves short wave length performance. The invented transducer may be employed with recording mediums having coercivity values in excess of 300 oersteds and as high as 500 oersteds. Also, the separation of the information signal and the bias signal improves isolation. In summary, a more efficient, economical and reliable transducer with performance improvement has been provided.

Figures 3, 4:
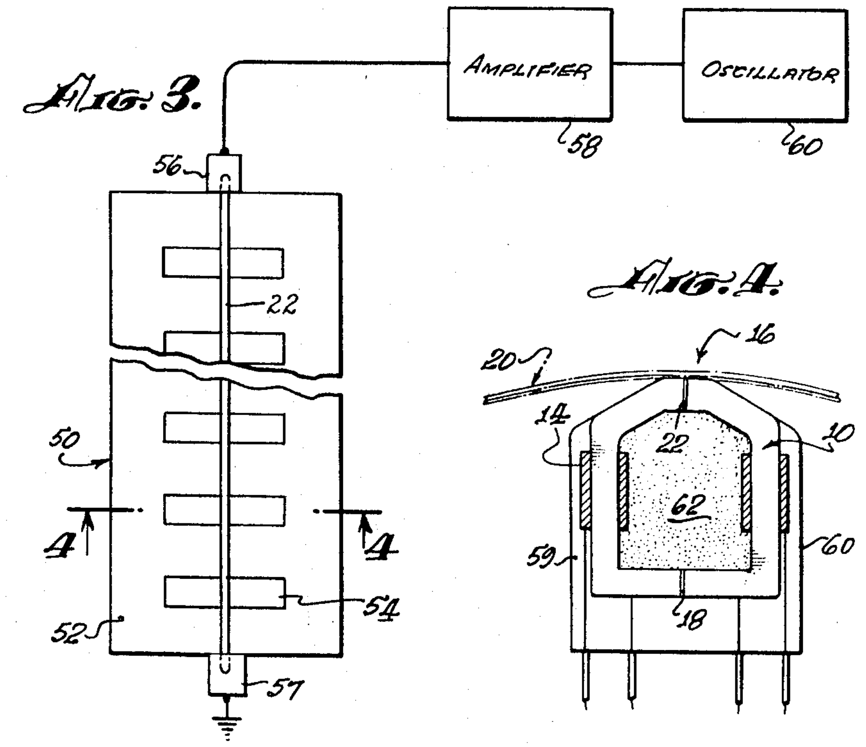
FIG. 3 is a plan view of a head stack employing the invention.
FIG. 4 is a sectional elevation taken along the lines 4—4 of FIG. 3.

An important alternate embodiment of the invention is shown in FIGS. 3 and 4, wherein the invented transducer is employed in a head stack 50 for simultaneously recording a plurality of tracks along recording medium 20. This embodiment takes advantage of certain novel aspects of the invention. When this embodiment is employed in instrumentation recorders with many tracks for recording wideband signal information (approximately DC–1.5 megacycles), the advantages of the invention are particularly pronounced.

This head stack 50 comprises a holding means 52 for supporting and holding a plurality of transducers 54 in fixed relationship. Each of the transducers 54 is substantially identical with the transducer shown in FIGS. 1, 2*a* and 2*b* with the exception that the gap spacer material is not included. An important feature of this embodiment of the invention is that the current-carrying means 22 is common to all the gaps and, consequently, a single current-carrying means 22 is employed to provide the bias for all of the transducers 54 in stack 50. The high-frequency bias signal may be supplied to current-carrying means 22 by oscillator 60 and amplifier 58 via coaxial connector 56.

The amplifier 58 and oscillator 60 comprise the bias means in this embodiment. It should be understood that at very high bias frequencies, such as frequencies in excess of 10 megacycles, the current-carrying means 22 along with the pole faces, core and holding means 52 acts electrically in a manner similar to a delay line or coaxial cable. For the purpose of simplifying this description, the delay line (current-carrying means 22, along with the pole faces, core and holding means 52) is shown as being ground at 57 which will result in an unbalanced mode of operation. Structurally, the ground connection would be made by connecting holding means 52 to current-carrying means 22. It may be preferred that the current-carrying means 22 is connected in a balanced mode by driving means 22 at one end and driving holding means 52 at the other end or opposite 57 with a bias signal out of phase with the signal supplied to means 22. The balance and unbalance mode of operation are well known in the coaxial cable and delay line art.

The oscillator 60 may take the form of a push-pull transistorized oscillator which generates a sinusoidal output signal. The amplifier 58 may take the form of a transistorized push-pull, tuned drive amplifier critically coupled to the transducer. Both the oscillator and amplifier may be designed for Class A operation. It should be noted that a single amplifier 58 and oscillator 60 are now employed to supply the bias signal for all of the transducers 54 and the recording medium adjacent thereto. Thus, the bias means normally associated with each of the transducers in prior art arrangements is eliminated, thereby substantially reducing the cost of the assembly.

The holding means 52 shown in FIGS. 3 and 4 may be constructed from a pair of non-magnetic metal side pieces 59 and 60 with the openings on the interior of the head stack filled with an epoxy resin 62 and the individual transducers separated by shielding (not shown) according to well-known techniques. The manner in which the holding means 52 is formed and the transducers are shielded does not form a part of this invention and in general is well known in the art.

From the above embodiment, it can be seen that the invented transducer has additional advantages when employed in a multi-track recorder. It is not uncommon in recorders to employ 14 or more tracks. In such an arrangement, a single oscillator connected to the current-carrying means replaces 14 oscillators. Typically, the cost for the stack with electronics is reduced by a factor of 10. The general trend is towards recorders having more and more tracks so that information from any sources may be simultaneously recorded. In such environments the invented transducer substantially reduces cost and weight, simplifies construction and improves reliability, while providing all of the recording advantages set forth with regard to the transducer shown in FIGS. 1 and 2.

Figure 5:
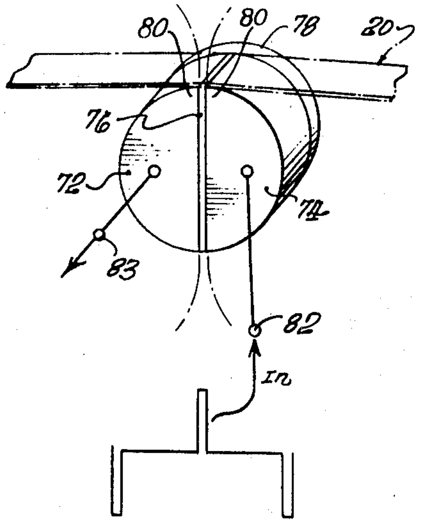
FIG. 5 is a simplified perspective view of an alternate embodiment of the invention; and, FIG. 6 is a simplified perspective view of another alternate embodiment of the invention.
Figure 6:
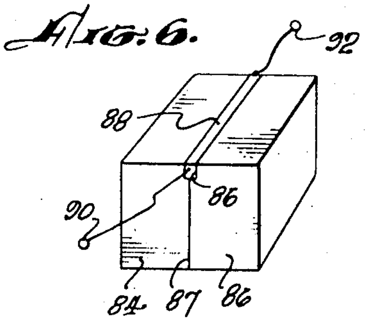

To fully appreciate the scope of this invention, two additional embodiments are shown in FIGS. 5 and 6. The embodiment shown in FIG. 5 comprises conductors 72 and 74 which take the form of half cylinders separated by a gap spacer 76. A third conductor 78, which may take the form of a cylindrical disc, is placed across the conductors 72 and 74 and electrically connected thereto. The conductor 74 has an input terminal 82 connected thereto while an output terminal 83 is connected to conductor 72. The recording medium 20 passes adjacent to the pole tips 80.

In operation, both the information signal and bias signal are supplied to the terminal 82. It is preferred that both the information signal and bias signal take the form of a high-frequency input signal. If low-frequency information signals are to be recorded, they should preferably be converted to high-frequency signals. One way this may readily be accomplished is by employing a pulse bias having a frequency in excess of one-half megacycle but typically 10 megacycles. The information signals are in essence sampled by the pulse bias and linearly added thereto, thereby altering the amplitude of the pulse bias in accordance with the information to be recorded. In this manner, both a high-frequency bias and information signal are supplied to input terminal 82. (Modulation techniques may also be employed to convert low-frequency information signals to higher-frequency signals.) The bias and information input signals cause a current to flow through conductor 74 and then through conductor 78 to conductor 72 and output terminal 83. At high frequencies this current tends to crowd toward the periphery of the conductors 72 and 74 with the greatest current density occurring in the vicinity of the pole tips 80. It is also in the vicinity of the pole tips 80 that the greatest magnetic fields are created and directed outwardly toward the recording medium 20.

The alternate embodiment shown in FIG. 6 comprises a pair of blocks 84 and 86 which may be made from sendust, a superconducting material, or other magnetic materials. The blocks 84 and 86 form a butt joint 87 and a groove 89 which receives the current-carrying means or conductor 88. A pair of terminals 90 and 92 are connected to conductor 88. The conductor 88 may be constructed from copper, titanium, beryllium copper or other suitable conductor materials. This embodiment is similar to the embodiment shown in FIG. 5 in that the information signal and bias signal are both supplied to terminals 90 and 92. It is similar to the embodiment shown in FIG. 1 in that in essence a tri-plate strip transmission line is formed by the sides of groove 89 and the conductor 88.

In operation, the information signal and high-frequency bias signal are supplied to input terminal 90 which cause a current in the conductor 88. This current in turn causes a magnetic field to bulge outwardly from groove 89. The shape of the field created by the information signal will depend on the frequency content of the information signal and whether or not it is converted to a high-frequency signal. It is within the broad scope of the invention to employ an information signal having a low-frequency or to convert the information signal to a high frequency. The latter form is the preferred.

In summary, the invention described above employs an unusually high bias frequency applied directly to a conductor in the gap. This solves many of the problems incident to prior art transducers simply and with maximum reliability. Some of the advantages are improved short wave length performance, lower core losses, less distortion, better recording medium penetration, sharper field gradient, less equalization required, better amplitude stability, and lower costs.

No effort has been made to exhaust the possible embodiments of the invention. It will be understood that the embodiment described is merely illustrative of the preferred form of the invention and various modifications may be made therein without departing from the scope and spirit of this invention.

What is claimed is:

1. An electromagnetic transducer for recording on a plurality of tracks of a magnetic medium moving adjacent thereto comprising:
- a plurality of electromagnetic members for varying the magnetization of said magnetic medium adjacent a predetermined portion of each member;
- a continuous means located in close proximity to said predetermined portions for independently varying the magnetization of said magnetic medium;
- electrical information signal input terminals coupled to said members for receiving different information signals; and,
- a bias means coupled to said means for supplying thereto a bias signal of a frequency substantially more than five times the highest frequency component of the information signal and at least in excess of one-half megacycle regardless of the magnitude of the highest frequency component of the information signal.

2. An electromagnetic transducer for recording on a plurality of tracks of a magnetic medium moving adjacent thereto comprising:
- a plurality of electromagnetic members for varying the magnetization of said magnetic medium adjacent gaps located in each of the members;
- current-carrying means located in close proximity to said gaps for independently varying the magnetization of said magnetic medium;
- electrical information signal input terminals coupled to said members for receiving different information signals; and,
- bias means coupled to said current-carrying means for supplying thereto a bias signal of a frequency substantially more than five times the highest frequency component of the information signal and in excess of one-half megacycle regardless of magnitude of the highest frequency component of the information signal.

3. An electromagnetic transducer as set forth in claim 2, and a pair of non-magnetic spacers separating the current-carrying means from said electromagnetic members.

References Cited

UNITED STATES PATENTS

| | | | |
|---|---|---|---|
| 2,479,308 | 8/1949 | Camras | 179—100.2 |
| 2,503,925 | 4/1950 | Tinkham | 179—100.2 |
| 2,647,167 | 7/1953 | Rettinger | 179—100.2 |
| 2,694,656 | 11/1954 | Camras | 179—100.2 |
| 3,262,124 | 7/1966 | Johnson et al. | 179—100.2 |

FOREIGN PATENTS

| | | |
|---|---|---|
| 1,120,172 | 12/1961 | Germany. |

OTHER REFERENCES

Proceedings of the I.R.E. February 1951, pp. 141–146.

TERRELL W. FEARS, Primary Examiner

J. R. GOUDEAU, Assistant Examiner

U.S. Cl. X.R.

340—174.1; 346—74